United States Patent [19]

Shimamura et al.

[11] Patent Number: 4,965,322
[45] Date of Patent: Oct. 23, 1990

[54] PHOTOSENSITIVE AND HEAT-SENSITIVE POLYMERS, PROCESS FOR PRODUCING THE SAME AND PROCESS FOR RECORDING INFORMATION USING THE SAME

[75] Inventors: Yasuki Shimamura, Fuji; Jyoji Ihata, Mishima, both of Japan

[73] Assignee: Asahi Kasei Kogyo Kabushiki Kaisha, Osaka, Japan

[21] Appl. No.: 171,590

[22] Filed: Mar. 22, 1988

[30] Foreign Application Priority Data

| Apr. 6, 1987 | [JP] | Japan | 62-83071 |
| Apr. 16, 1987 | [JP] | Japan | 62-91964 |
| Apr. 20, 1987 | [JP] | Japan | 62-95055 |
| May 18, 1987 | [JP] | Japan | 62-118865 |
| Jun. 1, 1987 | [JP] | Japan | 62-134934 |
| Jun. 12, 1987 | [JP] | Japan | 62-145235 |
| Jul. 10, 1987 | [JP] | Japan | 62-171074 |
| Jul. 15, 1987 | [JP] | Japan | 62-174899 |

[51] Int. Cl.$^5$ .................. C08C 19/70; C08F 8/36; C08F 36/04
[52] U.S. Cl. .................. 525/332.6; 525/344; 525/353; 526/287; 430/290; 430/300
[58] Field of Search .................. 525/332.6, 344, 353; 526/287

[56] References Cited

U.S. PATENT DOCUMENTS

| 3,740,258 | 6/1973 | Walles et al. | 117/94 |
| 4,113,666 | 9/1978 | Sano et al. | 521/29 |
| 4,147,708 | 4/1979 | Manchard | 260/413 |
| 4,157,432 | 6/1979 | Lundberg et al. | 526/31 |
| 4,220,739 | 9/1980 | Walles | 525/344 |
| 4,336,201 | 6/1982 | Feichtmayr et al. | 260/410.9 |
| 4,491,628 | 1/1985 | Ito et al. | 430/270 |
| 4,615,914 | 10/1986 | Walles | 427/237 |
| 4,618,564 | 10/1986 | Demmer et al. | 430/270 |

FOREIGN PATENT DOCUMENTS 58-149905 6/1983 Japan .

OTHER PUBLICATIONS

"Copper Chloride", Grant and Hackh's Chemical Dictionary, 5th Edition, McGraw—Hill Book Company, N.Y., p. 153.
Hawley's Condensed Chemical Dictionary, 11th Edition, Sax and Lewis, Van Nostrand Rheinhold Co.; New York, N.Y., p. 1043.

Primary Examiner—Marion C. McCamish
Assistant Examiner—Christopher D. RoDee
Attorney, Agent, or Firm—Armstrong, Nikaido, Marmelstein, Kubovcik & Murray

[57] ABSTRACT

A photosensitive and heat-sensitive polymer having conjugated polyenes and sulfonic acid groups and an absorbance ratio of a strong band in the region of 1200 cm$^{-1}$ to 1300 cm$^{-1}$ assignable to sulfonic acid groups adjacent to conjugated polyenes of at least 3 sequence lengths to a strong band near 1050 cm$^{-1}$ assignable to sulfonic acid groups in the IR spectrum of at least 0.6. The photosensitive and heat-sensitive polymer is obtained by the sulfonation of a polymer of an ethylenically unsaturated monomer having a number average molecular weight of at least 10,000 or a polymer having conjugated polyenes and a number average molecular weight of at least 10,000 and selected from specified polymers and copolymers. The photosensitive and heat-sensitive polymer is useful for information recording materials capable of being recorded by a laser beam or a thermal head for preparing printing plates, especially offset printing plates.

8 Claims, 1 Drawing Sheet

FIGURE
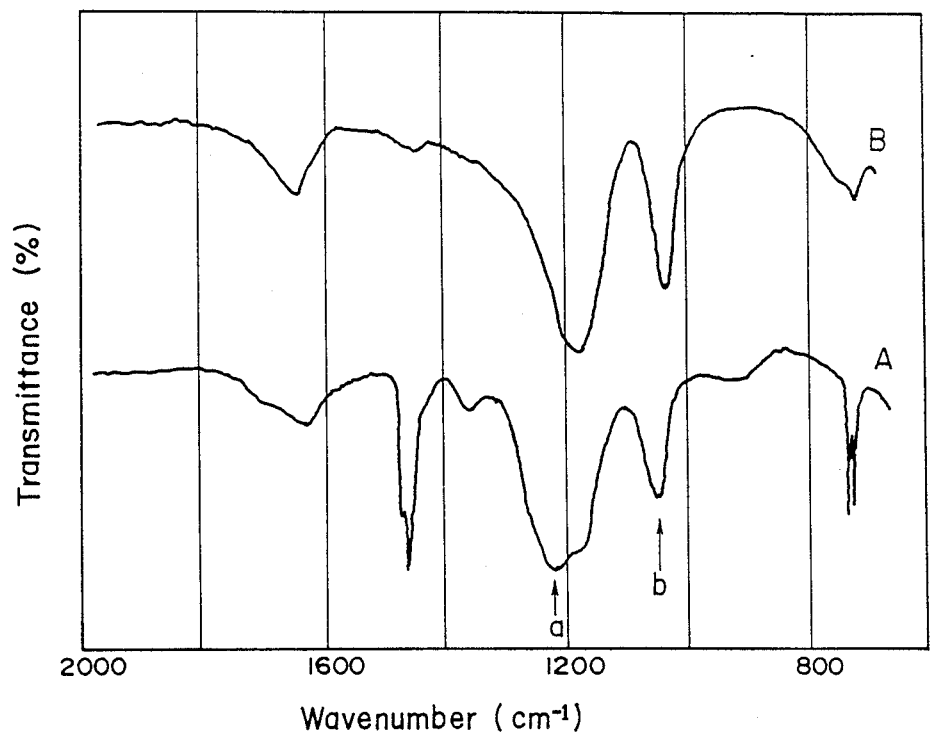

PHOTOSENSITIVE AND HEAT-SENSITIVE POLYMERS, PROCESS FOR PRODUCING THE SAME AND PROCESS FOR RECORDING INFORMATION USING THE SAME

BACKGROUND OF THE INVENTION

The present invention relates to photosensitive and heat-sensitive polymers having sulfonic acid groups and a process for producing the same. More specifically, it relates to photosensitive and heat-sensitive polymers which are sensitive not only to an ultraviolet ray, visible lights and a near infrared ray but also to heat and are useful as an information recording material from the industrial point of view.

DESCRIPTION OF THE PRIOR ART

As sulfonic acids sensitive to light, aromatic sulfonic acids are well known. For example, as reported in *Chemistry and Industry*, 21, 399~400 (1977), anthracene-9-sulfonates and naphthalene-1-sulfonates react to a UV ray from a mercury lamp to cause desulfonylation ($-SO_2$) or desulfonation ($-SO_3$). Japanese Patent Publication (OPI) No. 118501/1974 discloses a method of forming image patterns by using a $CO_2$ gas laser beam. This method comprises subjecting the surface layer of a shaped article of an oleophilic resin to chemical treatment to convert the surface layer into a hydrophilic layer and irradiating the hydrophilic layer with a laser beam to selectively remove the hydrophilic layer exposed to the laser beam. As one example of the chemical treatment, compounds having an aromatic ring such as polystyrene are sulfonated. However, in order for the hydrophilic layer to be rendered photosensitive, a UV ray is necessary. Recently, information recording systems using a laser beam which is modulated in response to output signals from a computer have been commercialized, and when the above described materials are employed in these systems, a UV laser beam must be employed. However, the UV laser generator is not only large and expensive but also the sensitivity efficiency is low, and accordingly it is difficult for such a generator to be employed industrially. Further, since the hydrophilic layer is etched by a violent thermal decomposition with the use of a laser beam, a lot of energy is necessary for forming image patterns and the resolution is lowered due to the adhesion of burned scales and polymer scums formed to the imaging portions, and as a result there has been no commercialization of this system.

For example, a compound having a sulfonic acid group in the molecule such as polyvinylsulfonic acid shows neither photosensitivity nor heat-sensitivity. This compound shows characteristic bands near 1050 cm$^{-1}$ and near 1175 cm$^{-1}$ assignable to sulfonic acid groups in the IR spectrum as illustrated (B) in the drawing (FIGURE). Further, a polymer having aromatic nuclei in the molecule such as polystyrene can easily be sulfonated with concentrated sulfuric acid or fuming sulfuric acid to introduce sulfonic acid groups onto the nuclei but the sulfonated polymer shows neither photosensitivity nor heat-sensitivity. A sulfonated polymer shows a band near 1050 cm$^{-1}$ and a characteristic band in the region of 1100 cm$^{-1}$ to 1200 cm$^{-1}$ assignable to sulfonic acid groups introduced into the aromatic nuclei.

U.S. Pat. No. 3,740,258 discloses resinous enclosure members obtained by sulfonating non-aromatic polymers and describes that with only a trace amount of sulfate, substantially all of the sulfur atoms are present in the form of

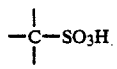

in the sulfonated polymers. Thus it ca these sulfonated polymers substantially show neither photosensitivity nor heat-sensitivity.

Japanese Patent Publication (OPI) No. 52392/1985 discloses planographic printing plate materials obtained by sulfonating the surface of a polymer having a water absorption of at most 0.2%. Such materials require a coating of a photosensitive resin on the surface of the sulfonated polymer for forming image patterns. Further, Japanese Patent Publication (OPI) Nos. 102622/1985 and 132760/1985 disclose a method for preparing offset printing plates by forming a hydrophilic layer on a polymer by various types of treatments including sulfonation and removing the hydrophilic and photosensitive groups by exposure to a flash light with an energy density of at least $3 \times 10^{2}$ W/cm$^2$ for an emission period of time of at most 20 milliseconds or exposure to a laser beam with an energy density of at least $1 \times 10^{6}$ W/cm$^2$. This method which does not require various steps such as developing, fixing, etching and a gum coating process is superior as a method of preparing offset printing plates but disadvantageously requires a light of a high energy density.

SUMMARY OF THE INVENTION

Under such circumstances, the present inventors made intensive studies, and as a result have accomplished the present invention. According to the present invention there are provided a photosensitive and heat-sensitive polymer having conjugated polyenes and sulfonic acid groups and an absorbance ratio of a strong band in the region of 1200 cm$^{-1}$ to 1300 cm$^{-1}$ assignable to sulfonic acid groups adjacent to conjugated polyenes of at least 3 sequence lengths to a strong band near 1050 cm$^{-1}$ assignable to sulfonic acid groups in the IR spectrum of at least 0.6, a process for producing the same, a process for recording information which comprises contacting a thermal head with the photosensitive and heat-sensitive polymer and a process for recording information which comprises irradiating the photosensitive and heat-sensitive polymer with a modulated laser beam.

BRIEF DESCRIPTION OF THE DRAWINGS

FIGURE is IR spectra of a sulfonated polyethylene film (A) according to this invention and polyvinylsulfonic acid (B).

DETAILED DESCRIPTION OF PREFERRED EMBODIMENTS

The photosensitive and heat-sensitive polymers having conjugated polyenes and sulfonic acid groups of the present invention can be obtained by sulfonating polymers of ethylenically unsaturated monomers having a number average molecular weight of at least 10,000 or polymers having conjugated polyenes and a number average molecular weight of at least 10,000.

The polymers of ethylenically unsaturated monomers having a number average molecular weight of at least 10,000 or the polymers having conjugated polyenes and a number average molecular weight of at least 10,000 which can be employed in the sulfonation reaction of the present invention may be any commercially available polymers or can be prepared by a conventionally employed process. With number average molecular weights of at least 10,000 the separation of the sulfonated product from the reaction mixture by precipitation or filtration can be easily conducted.

Exemplary polymers of ethylenically unsaturated monomers having a number average molecular weight of at least 10,000 or polymers having conjugated polyenes and a number average molecular weight of at least 10,000 include homopolymers or copolymers of an olefin having 2 to 8 carbon atoms such as ethylene, propylene, butene-1, 4-methylpentene-1, hexene-1 and octene-1; homopolymers or copolymers of a halogenated olefin having 2 to 3 carbon atoms such as vinyl chloride, vinylidene chloride, vinyl fluoride, vinylidene fluoride, ethylene trifluoride, ethylene tetrafluoride, propylene hexafluoride and vinyl bromide and copolymers of such a halogenated olefin and an olefin having 2 to 8 carbon atoms as described above; homopolymers or copolymers of an olefin having a polar group such as a nitrile group, an ester group and an acetate group and copolymers of such an olefin and an olefin having 2 to 8 carbon atoms as described above; crosslinked aromatic polymers comprising 50 to 98% by mol of a monovinyl or monovinylidene aromatic monomer unit and 2 to 50% by mol of a polyvinyl monomer unit; and homopolymers or copolymers having conjugated polyenes of at least 3 sequence lengths.

Especially when the sulfonated polymers are employed in the form of a film or sheet as an offset printing plate, the polymers which can be subjected to the sulfonation reaction preferably have a water absorption of at most 2.0%. Water absorptions of more than 2.0% unfavorably lower the dimensional stability of the printing plates so prepared. In the present invention the water absorption is determined by the following equation:

$$\text{Water absorption (\%)} = \frac{W_2 - W_1}{W_1} \times 100$$

wherein $W_1$ is the weight of a polymer in the form of a powder or a film or sheet dried over calcium chloride at 25° C. for 5 days and $W_2$ is the weight of the polymer after immersion in water at 25° C. for 24 hours and wiping of the water.

Especially when the homopolymers or copolymers of an olefin having 2 to 8 carbon atoms after sulfonation are employed in the preparation of printing plates having sensitivity in their surfaces, excellent dimensional stability and image formability, high density polyethylenes having a density of 0.94 to 0.97 produced by the conventional low or middle pressure methods are preferred.

When the copolymers of a halogenated olefin having 2 to 3 carbon atoms and an olefin having 2 to 8 carbon atoms are employed in the sulfonation reaction, the rate of sulfonation in the sulfonation reaction is decreased with increased amounts of the halogenated olefins but the photosensitivity of the sulfonated copolymers obtained is advantageously increased for practical purposes.

Suitable examples of the homopolymers or copolymers of an olefin having a polar group and the copolymers of such an olefin and an olefin having 2 to 8 carbon atoms include polyacrylonitrile, polymethacrylonitrile, polymethyl acrylate, polyethyl acrylate, polyvinyl acetate and ethylene-vinyl acetate copolymer. These polymers can afford photosensitive, heat-sensitive polymers having excellent hydrophilicity after sulfonation, and the offset printing plates prepared from the sulfonated polymers can afford excellent prints free from the occurrence of scumming.

The crosslinked aromatic polymers can be obtained by the polymerization of a monovinyl or monovinylidene aromatic monomer and a polyvinyl monomer.

Exemplary monovinyl or monovinylidene aromatic monomers which can be employed in this invention include styrene, α-methylstyrene, chloromethylstyrene and vinylnaphthalene, and exemplary polyvinyl monomers include polyvinyl aromatic compounds such as divinylbenzene, divinylxylene and trivinylbenzene; polyvinyl heterocyclic compounds such as divinylpyridine and trivinylpyridine; and polyvinylidene aliphatic compounds such as ethylene glycol dimethyl methacrylate and trimethylolpropanetrimethyl methacrylate.

When the amount of the polyvinyl monomer unit is less than 2% by mol, part of the reaction product is disadvantageously dissolved out in the sulfonation reaction. On the other hand, when the amount of the polyvinyl monomer unit is more than 50% by mol, the processability of the polymers obtained is reduced. Thus, for practical purposes it is preferred that the amount of the polyvinyl monomer unit is 10 to 50% by mol.

Preferred methods of preparing the crosslinked aromatic polymers are bulk polymerization and suspension polymerization. When bulk polymerization is employed, for example, styrene is partially polymerized or polystyrene is dissolved in styrene and then, for example, divinylbenzene and a catalyst such as benzoyl peroxide are added thereto and the resultant mixture is polymerized. The polymer thus obtained is pulverized or cut into a film or sheet of 50 to 500 μm, preferably 100 to 200 μm, in thickness. When suspension polymerization is employed, a mixture of the above described monomers is added with a catalyst such as azobisisobutyronitrile and water as the reaction medium, and then polymerized by a conventional method. The polymer thus obtained is thoroughly washed, dried and pulverized and, if necessary or desired, formed into a film or sheet by a conventional method of making ion exchange membranes which comprises mixing the polymer in the form of powder with a plasticizer such as dioctyl phthalate and a dispersing agent such as cyclohexanone, mixing the resultant mixture with a paste of polyvinyl chloride obtained by heating, kneading the mixture thus obtained by rolls and forming the mixture into a film or sheet of 50 to 500 μm, preferably 100 to 200 μm, in thickness while evaporating the dispersing agent.

Since the crosslinked aromatic polymers can afford sulfonated polymers having excellent dimensional stability and rigidity, the offset printing plates obtained therefrom as such have excellent dimensional stability and are convenient to handle in the printing procedure and result in prints having excellent dimensional stability, and thus reinforcing materials for the printing plates such as an aluminum sheet or plate or a glass cloth sheet can be spared.

The polymers having conjugated polymers having at least 3 sequence lengths can be prepared by a conventional method of preparing polyacetylenes. Practically these polymers can be prepared by dehydrohalogenation of the homopolymers or copolymers of a halogenated olefin having 2 to 3 carbon atoms or the copolymers of such a halogenated olefin and an olefin having 2 to 8 carbon atoms as described above with a polar solvent solution containing 5 to 50% by weight of an organic or inorganic salt or by the dehydration of polyvinyl alcohol with a hydrogen halide such as hydrogen chloride. Such polar solvents include, for example, methanol, ethanol and dimethylformamide and such organic and inorganic salts include, for example, sodium hydroxide, potassium hydroxide, triethylamine and trimethylbenzylammonium hydroxide. According to these methods not only can the sequence length of conjugated polyenes be easily controlled but also comparatively long sequence lengths of conjugated polyenes can be obtained, and accordingly it is possible to design sulfonated polymers having high sensitivity to light of desired wavelengths.

In the present invention any sulfonation method can be employed. For example, the polymers of ethylenically unsaturated monomers having a number average molecular weight of at least 10,000 or the polymers having conjugated polyenes and a number average molecular weight of at least 10,000 in the form of powder, a film or sheet may be immersed in fuming sulfuric acid or sulfuric anhydride as such or diluted with an organic solvent which is relatively less active to sulfuric anhydride such as chloroform, carbon tetrachloride and ethylene dichloride. The sulfonating agents which can be employed in the present invention may vary depending upon the polymer employed but in general, the use of an oxidative sulfonating agent such as fuming sulfuric acid and sulfuric anhydride can afford a sulfonated polymer having a strong band near 1050 cm$^{-1}$ and a strong band in the region of 1200 cm$^{-1}$ to 1300 cm$^{-1}$ in its IR spectrum. The strong band in the region of 1200 cm$^{-1}$ to 1300 cm$^{-1}$ shows the formation of sulfonic acid groups adjacent to conjugated polyenes of least 3 sequence lengths.

Further, other sulfonating agents which are not highly oxidative and widely employed in the chemical industries and include, for example, chlorosulfonic acid, and adducts of sulfonic anhydride and dimethylformamide or dioxane can be used. When these sulfonating agents are employed alone in the present invention, the formation of the usual sulfonic acid groups prevails over that of the sulfonic acid groups adjacent to conjugated polyenes of at least 3 sequence lengths, and accordingly it is difficult to attain an absorbance ratio above 0.6. Thus, an additional treatment with an oxidizing agent such as sulfuric anhydride and sodium hypochloride is required after the sulfonation reaction with such sulfonating agents.

The sulfonation reaction can be conducted either continuously or batchwise. When the polymer in the form of a film or sheet is employed in the sulfonation reaction, the sulfonation reaction can be continuously carried out to produce a uniformly sulfonated polymer in the form of a film or sheet in a large quantity which is advantageous from the industrial viewpoint.

The temperature of the sulfonation reaction which can be employed in this invention is typically $-30°$ C. to 70° C. and in order to increase the rate of formation of the sulfuric acid groups adjacent to conjugated polyenes of at least 3 sequence lengths, it is preferred to lower the temperature, and accordingly the temperature is preferably 0° C. to 40° C. When the temperature is higher than 70° C., various side reactions tend to occur. On the other hand, when sulfuric anhydride is employed in a gaseous form, temperatures below $-30°$ C. tend to cause abnormality in the reaction procedure due to adhesion of the liquefied sulfuric anhydride gas to the wall of a tube used for the introduction of the gas into a reaction vessel and to slow down the rate of formation of the sulfonic acid groups adjacent to conjugated polyenes of at least 3 sequence lengths. This is unfavorable from an economic viewpoint.

The period of time of the sulfonation reaction should be selected depending upon the temperature of the sulfonation reaction employed and is typically 1 to 90 minutes. For example, the period of time of the sulfonation reaction is 5 to 60 minutes at 0° C. and 1 to 30 minutes at 40° C.

As the sulfonation reaction progresses, the sequence length of polyenes adjacent to sulfonic acid groups is extended and the number of sulfonic acid groups increases. This can be measured quantitatively by the absorbance ratio of a strong band in the region of 1200 cm$^{-1}$ to 1300 cm$^{-1}$ to a strong band near 1050 cm$^{-1}$ in the IR spectrum of the sulfonated polymer.

The absorbance ratio which is employed in the present invention is determined by the base line method conventionally employed in the analysis of IR spectra. More specifically, the absorbance ratio of the present invention is determined based on a base line common to strong bands near 1050 cm$^{-1}$ and 1170 cm$^{-1}$ assignable to sulfonic acid groups and a strong band in the region of 1200 cm$^{-1}$ to 1300 cm$^{-1}$ assignable to sulfonic acid groups adjacent to conjugated polyenes of at least 3 sequence lengths in the IR spectra of the sulfonated polymers. When the absorbance ratio is 0.6 or more, the sulfonic acid groups of the sulfonated polymers show photosensitivity and heat-sensitivity. When the sulfonated polymers of the present invention are used as information recording materials which are recorded using a semiconductor laser or a thermal head, the absorbance ratio is preferably 1.1 or more. The absorbance ratio of the sulfonated polymers of the present invention obtained by the usual sulfonation reactions is at most 2.3 and it is generally difficult to obtain an absorbance ratio above 2.3.

In general, as the sulfonation reaction progresses, the degree of sulfonation and the absorbance ratio are increased. However, the absorbance ratio is not always linearly related to the degree of sulfonation. Thus optimal conditions for the sulfonation reaction should be selected depending upon the polymer chosen. In the present invention it is preferred that the sulfonated polymer in the form of a film or sheet of 5 to 500 $\mu$m in thickness have a degree of sulfonation of $5 \times 10^{-5}$ to $1 \times 10^{-1}$ milliequivalent/cm$^2$ in terms of exchange capacity. When the degree of sulfonation is less than $5 \times 10^5$ milliequivalent/cm$^2$, the advantageous effect of the sulfonic acid groups such as hydrophilicity is smaller. On the other hand, under the reaction conditions for obtaining a degree of sulfonation of more than $1 \times 10^{-1}$ milliequivalent/cm$^2$, side reactions are brought about which disadvantageously deteriorate the sulfonated polymer by oxidation.

In the present invention the degree of sulfonation is determined by immersing powder or a film or sheet of the polymer whose surface has been sulfonated in a 1 N aqueous calcium chloride solution to be in the equilibrium as set forth in the following equation;

$$-SO_3H + CaCl_2 \rightleftarrows -SO_3Ca_{\frac{1}{2}} + HCl$$

titrating the amount of the hydrogen chloride formed in the aqueous solution with a 0.1 N aqueous sodium hydroxide solution, obtaining a neutralization value with phenolphthalein as the indicator and calculating a degree of sulfonation according to the following equation.

*Degree of sulfonation* $= (0.1 \times f \times X)/W$
*(milliequivalent)* wherein f is a factor of the 0.1 N aqueous sodium hydroxide solution; X is a neutralization value by phenolphthalein; and W is surface area ($cm^2$) of the film or sheet of the sulfonated polymer.

When the polymer is sulfonated, it is colored. In the case of polyethylene it becomes brown and it can be bleached with sodium hypochlorite or hydrogen peroxide as described in U.S. Pat. No. 3,740,258. In general, the bleaching of colored shaped articles with the above described oxidizing agent is a widely employed method in the industry but it has now been discovered that the treatment of the polymer having conjugated polyenes and sulfonic acid groups of the present invention with an oxidizing agent increases its photosensitivity and heat-sensitivity. Furthermore, when the polymer having conjugated polyenes and sulfonic acid groups which has undergone the oxidation treatment is employed in the preparation of offset printing plates, the adhesion of printing ink can be improved and clear, deep prints can be obtained.

The oxidizing agents which can be employed in the treatment of the polymer having conjugated polyenes and sulfonic acid groups of the present invention include, for example, sodium or potassium hypochloride solutions, hydrogen peroxide solutions, sulfuric acid solutions of a sodium or potassium dichromate, sodium or potassium perchlorate solutions and potassium permanganate solutions. Of these oxidizing agents, sodium hypochloride solutions are not only inexpensive and easily available but are also very effective for the formation of image patterns and the adhesion of printing ink, and accordingly are superior as the oxidizing agent for the preparation of offset printing plates.

The oxidation conditions may vary depending upon the oxidizing agent employed and the form of sulfonated polymer, i.e., powder, film or sheet, chosen, and optimal conditions should be selected according to the kind of oxidizing agent and the form of the sulfonated polymer employed.

The color of the sulfonated polymer of the present invention is yellowish green to reddish brown and it is preferred that the oxidation treatment is carried out to such an extent that the color of the sulfonated polymer is slightly to remarkably decolored, i.e., in general, yellow to yellowish brown. However, when the oxidation treatment is carried out to the extent that the color of the sulfonated polymer is completely decolored, the above described advantageous effects cannot be obtained.

The sulfonated polymer as such or the sulfonated polymer additionally treated with the oxidizing agent can be formed into a variety of shapes such as films, sheets and discs. For example, the polymer is dissolved in water or a polar solvent such as dimethylformamide and N-methylpyrrolidone or uniformly dispersed in polyvinyl alcohol or starch paste and then coated on a film, sheet, plate or roll of plastics such as polyethylene terephthalate, polymethyl methacrylate and polycarbonate or a sheet, plate or roll of a metal such as aluminum and copper to form a film or sheet.

The sulfonated polymer in the form of powder, film or sheet of the present invention is sensitive to laser beams of the visible light region and the near infrared region and thus information can be recorded thereon by a beam of widely used lasers such as Ar laser, He-Ne laser, YAG laser and $CO_2$ gas laser and further a beam of a semiconductor laser having an output of 10 to 15 mW. In particular, when a modulated laser beam is used to irradiate the sulfonated polymer in the form of a film or sheet as an offset printing plate, the irradiated portions become imaging portions of the offset printing plate. The method for making offset printing plates using a modulated laser beam without developing, fixing, etching and any gum coating process can provide not only an apparatus of a small, compact size compared to a conventional optical system of silver salt photography and a conventional electrostatic-toner but is also a simple and convenient imaging process with high resolution since the exposed portions as such become imaging portions.

Furthermore, the sulfonated polymer of the present invention is sensitive to a thermal head which is employed as a thermal printer of conventional word processors or facsimiles. This method comprises forming image patterns by conveying heat generated by applying a pulse electric current to a resistor to a heat-sensitive material. Since the sulfonated polymer of the present invention is employed in the form of a film or sheet as an offset printing plate, the portions contacted with the thermal head as such become imaging portions. Thus this method can provide a computerized offset printing plate production system by connecting a thermal head with the output part of a computer.

Still further, when the sulfonated polymer as such or the sulfonated polymer additionally treated with the oxidizing agent is treated with an aqueous silver nitrate solution or an aqueous copper chloride solution to convert the sulfonic acid groups to silver sulfonate groups or copper sulfonate groups, the photosensitivity of the polymer thus modified is remarkably improved, and such a modified polymer in the form of a film or sheet or a disc can afford inexpensive information recording materials capable of being recorded with high precision by a laser beam as described above which is modulated in response to output signals from a computer.

The following examples illustrate the present invention in more detail.

In the present invention, IR spectra were recorded on a JASCO DS-402G infrared spectrophotometer and UV-visible light reflectance spectra were recorded on a Hitachi 300 spectrometer.

EXAMPLE 1

Three hundred grams of high density polyethylene powder (density 0.95; number average molecular weight 10,000; average particle diameter 3 μm) was dispersed in 600 ml of ethylene dichloride in a 2000 ml three-necked flask equipped with a stirrer, a gas inlet and an exhaust gas tube. The flask was cooled from its outside so that the temperature of the mixture was kept at 0° C., and then a mixture of gaseous $SO_3$ and $N_2$ gas (volume ratio 1:2) was introduced into the flask at a rate of 1 l/min for 20 hours with stirring. After completion of the sulfonation, the sulfonated polyethylene powder was separated by filtration, thoroughly washed with water and then air-dried. The product thus obtained was brown, the degree of sulfonation was 0.01 milliequivalent/g and the IR absorbance ratio was 1.3. This product was dispersed in 500 g of starch paste and coated on an aluminum roll (diameter 130 mm) to form a coating (thickness about 5 μm). Then a focused beam of 20 μm in diameter from a He-Ne laser (product of Nippon Electric Co., Ltd. ; GLG 5400, output 10 mW) was used to scan the coating of the aluminum roll rotating at a rate of 3 m/sec. The part scanned by the laser beam was darkened to give clear patterns of 21 μm line width.

EXAMPLE 2

One hundred grams of polyvinyl chloride powder (degree of polymerization 1100 ; average particle diameter 2 μm) was placed in a 500 ml four-necked flask equipped with a stirrer, an inlet tube for gaseous $SO_3$, an inlet tube for $N_2$ gas and an exhaust tube connected to a stopcock, a vacuum gauge and a vacuum pump. After the inner atmosphere of the flask was replaced with $N_2$ gas, the flask was cooled with a mixture of ice and water, and then the inner pressure of the flask was reduced to 300 Torr by a vacuum pump and the stopcock was closed. Then gaseous $SO_3$ was introduced into the flask until the pressure reached 450 Torr and stirring was continued for 20 minutes. The procedure of the introduction of gaseous $SO_3$ and the stirring was repeated three times. After completion of the sulfonation, the contents were taken out from the flask, washed with water and air-dried. The sulfonated polyvinyl chloride thus obtained was further treated with a 10% by weight aqueous sodium hypochlorite solution for one hour. The degree of sulfonation was $5.4 \times 10^{-3}$ milliequivalent/g and the IR absorbance ratio was 1.4.

Further, the sulfonated polyvinyl chloride was treated with 2N aqueous hydrochloric acid, thoroughly washed with water and then treated with 1N aqueous silver nitrate to convert the sulfonic acid groups to the silver salts. The powder thus obtained was pale yellow. Then this powder was air-dried and dispersed in 150 g of polyvinyl alcohol and coated on a polyethylene terephthalate film (size 10 cm × 15 cm ; thickness 200 μm) to form a coating (thickness 5 μm). The film thus obtained was fixed on the same aluminum roll as employed in Example 1 with an adhesive and then a focused beam through an optical lens from a semiconductor laser (product of Sharp Kabushiki Kaisha, LT-027 MD/MF, output 10 mW) was used to scan the coating of the aluminum roll rotating at a rate of 2 m/sec. The part scanned by laser beam was blackened to give clear patterns of 10 μm line width.

EXAMPLE 3

An ethylene-vinyl acetate copolymer (monomer ratio of ethylene to vinyl acetate at the initiation of polymerization 90:10; density 0.93; number average molecular weight 15,000) was pulverized to powder of 2 to 10 μm and subjected to sulfonation in the same manner as in Example 2 except that the procedure of the introduction of gaseous $SO_3$ and the stirring was conducted one time. After completion of the sulfonation, the contents were taken out from the flask, thoroughly washed with water and dried under reduced pressure. The powder thus obtained was dark brown, the degree of sulfonation was $8.1 \times 10^{-3}$ milliequivalent/g and the IR absorbance ratio was 1.1.

Then the powder was dissolved in a mixed solvent of N-methylpyrrolidone and water (volume ratio 90:10) and after insolubles were separated by filtration, the solution was coated on a polyethylene terephthalate film (size 10 cm × 15 cm, thickness 200 μm) to give a coating (thickness 2 μm). The same semiconductor laser beam as employed in Example 2 was used to scan the coating of the polyethylene terephthalate film fixed on the aluminum roll in the same manner as in Example 2. The part scanned by the laser beam was darkened to give clear patterns of 12 μm line width.

EXAMPLE 4

High density polyethylene films (density 0.96; number average molecular weight 100,000; size cm × 15 cm; thickness 200 μm) were mounted on a glass rack, placed in a dried glass vessel equipped with an inlet tube for a mixture of gaseous $SO_3$ and $N_2$ gas and an exhaust tube and cooled from its outside so that the inner temperature of the vessel was kept at a temperature of 0° C. to 5° C. Then a mixture of gaseous $SO_3$ and $N_2$ gas (volume ratio 1:2) was introduced into the vessel at a rate of 1 l/min for 25 minutes to conduct sulfonation. After completion of the sulfonation, the films were taken out from the vessel, thoroughly washed with water and air-dried. The degree of sulfonation of the films thus obtained was $7.2 \times 10^{-4}$ milliequivalent/$cm^2$. The IR spectrum of the sulfonated films is shown as A in FIGURE and the IR absorbance ratio was 1.7. Subsequently several films thus sulfonated were fixed on the same aluminum roll as employed in Example 1 with an adhesive and a focused beam of 40 μm in diameter from the same He-Ne laser as employed in Example 1 was used to scan the films of the aluminum roll rotating at a rate of 50 cm/sec. Also, several films thus sulfonated were contacted with a thermal head of a word processor (manufactured by Sharp Kabushiki Kaisha, "Shoin", WD-300F) to give printing plates. The printing plates of two types thus prepared were mounted on an offset printing machine (manufactured by Ricoh Co., Ltd.; Autoprinter AP4700) to conduct offset printing. As a result, prints having clear patterns of 45 μm line width were obtained from the former printing plates and prints having clear letters were obtained from the latter printing plates.

EXAMPLE 5

The same high density polyethylene films as employed in Example 4 were sulfonated under the conditions as set forth in Table 1, washed with water and air-dried in the same manner as in Example 4. The sulfonated polyethylene films thus obtained were contacted with the same thermal head of the word processor as employed in Example 4 to give printing plates, and then the printing plates thus obtained were mounted on the same offset printing machine as in Example 4 and subjected to offset printing. The results are set forth in Table 1.

TABLE 1

| Sample No. | Conditions of Sulfonation Temperature (°C.) | Time (minutes) | Degree of Sulfonation (milliequivalent/cm$^2$) | IR Absorbance Ratio | Evaluation of Prints |
| --- | --- | --- | --- | --- | --- |
| 1 | 0 | 15 | $1.3 \times 10^{-4}$ | 1.1 | A |
| 2 | 0 | 40 | $1.4 \times 10^{-2}$ | 2.0 | A |
| 3 | 30 | 15 | $2.0 \times 10^{-3}$ | 1.1 | A |
| 4 | 60 | 8 | $2.5 \times 10^{-3}$ | 0.6 | B |
| 5 | 0 | 5 | $2.5 \times 10^{-3}$ | 0.3 | C |
| 6 | 30 | 35 | $9.6 \times 10^{-3}$ | 0.5 | C |
| 7 | 60 | 15 | $1.7 \times 10^{-3}$ | 0.4 | C |

Note:
Samples Nos. 5-7 are comparative samples.
Evaluation of Prints: (by naked eye)
A excellent
B good
C poor

EXAMPLE 6

The same high density polyethylene film as employed in Example 4 was immersed in fuming sulfuric acid containing about 15% by weight of sulfuric anhydride at 0° C. for 20 hours to conduct sulfonation. After completion of the sulfonation, the sulfonated film was thoroughly washed with water, neutralized with 1N aqueous NaOH and air-dried. The degree of sulfonation was $8.2 \times 10^{-3}$ milliequivalent/cm$^2$ and the IR absorbance ratio was 0.7.

Then the film thus obtained was fixed on the same aluminum roll as employed in Example 1 and a focused beam of 40 μm in diameter from a YAG laser (product of Nippon Electric Co., Ltd.; SL 129,output 500 mW) was used to scan the film of the aluminum roll rotating at a rate of 1 m/sec. The film was subjected to the same offset printing as in Example 4 to give prints having clear patterns of about 36 m line width.

Example 7

A linear low density polyethylene film containing 3% by mol of 4-methylpentene-1 (number average molecular weight about 30,000; size B-4; thickness 150 μm) was sulfonated in the same manner as in Example 4 except that the period of time of sulfonation was 20 minutes. After completion of the sulfonation, the film was thoroughly washed with water and air-dried. The degree of sulfonation of the film was $1.4 \times 10^{-3}$ milliequivalent/cm$^2$ and the IR absorbance ratio was 1.2.

The film was contacted over 20 seconds with a thermal head of 4,000 dots per 250 mm of a line printer and subjected to the same offset printing as in Example 4 to give clear prints.

EXAMPLE 8

A polybutene-1 film (number average molecular weight 50,000; size 10 cm × 15 cm; and thickness 100 μm) was immersed in an ethylene dichloride solution containing 10% by weight of sulfuric anhydride at 0° C. for 40 hours to sulfonate the film. After completion of the sulfonation, the film thus sulfonated was thoroughly washed with water and air-dried. The degree of sulfonation of the film thus obtained was $1.6 \times 10^{-4}$ milliequivalent/cm$^2$ and the IR absorbance ratio was 1.2.

Then the film was processed with the same thermal head of the word processor as employed in Example 4 to give a printing plate. The printing plate was mounted on the same offset printing machine as in Example 4 and subjected to the same offset printing as in Example 4 to give prints having clear letters.

EXAMPLE 9

A commercially available polyvinyl chloride film (product of Sumitomo Bakelite Co., Ltd.; "Sumilite" VSS; water absorption at most 0.1%; size 10 cm × 15 cm; thickness 200 μm) was sulfonated in the same manner as in Example 4. After completion of the sulfonation, the film was thoroughly washed with water and air-dried. The degree of sulfonation of the film thus obtained was $2.3 \times 10^{-3}$ milliequivalent/cm$^2$ and the IR absorbance ratio was 1.2. This film was fixed on the same aluminum roll as in Example 1 with an adhesive and the same He-Ne laser beam as in Example 4 focused to a beam diameter of 20 μm was used to scan the film of the aluminum roll rotating at a rate of 5 m/sec. The printing plate thus prepared was subjected to the same offset printing as in Example 4 to give prints having clear patterns of 23 μm line width.

COMPARATIVE EXAMPLE 1

The procedures of Example 9 were repeated except that the sulfonation was conducted at 60° C. for 10 minutes and that after completion of the sulfonation, the film was thoroughly washed with water, neutralized with 1N aqueous sodium hydroxide and air-dried. The degree of sulfonation of the film thus obtained was $1.7 \times 10^{-2}$ milliequivalent/cm$^2$ and the IR absorbance ratio was 0.5. Then offset prints were obtained in the same manner as in Example 9. The lines and patterns of the prints thus obtained were not clear.

EXAMPLE 10

The same polyvinyl chloride film as employed in Example 9 was mounted on a stainless steel rack and immersed in a 40% by weight aqueous sodium hydroxide solution at 80° C. for 4 hours to conduct heat treatment. As a result, a brown film was obtained. This film was thoroughly washed with water and dried in a reduced pressure drier maintained at 60° C. for 3 hours. The UV-visible light reflectance spectrum of the film thus obtained showed a broad strong absorption at near 500 nm and thus it could be understood that conjugated polyenes had been formed on the surface of the film.

Then the film thus treated was mounted on a stainless steel rack, placed in a four-necked separable flask equipped with an inlet tube for gaseous SO$_3$, an inlet tube for N$_2$ gas and an exhaust tube and subjected to sulfonation under the same conditions as in Example 3.

After completion of the sulfonation, the stainless steel rack was taken out from the flask, and the film was thoroughly washed with water and then air-dried in a dark place. The degree of sulfonation of the film thus obtained was $4.1 \times 10^{-3}$ milliequivalent/cm$^2$ and the IR absorbance ratio was 1.8.

Then the film was fixed on the same aluminum roll as employed in Example 1 with an adhesive and a focused beam of 20 μm in diameter from the same He-Ne laser as in Example 4 was used to scan the film on the aluminum roll rotating at a rate of 15 m/sec. The printing plate thus prepared was mounted on an offset printing machine (manufactured by Duplo Co., Ltd.; DP-3100) to conduct offset printing. As a result, prints having clear patterns of 21 μm line width were obtained.

EXAMPLE 11

The same polyvinyl chloride film as employed in Example 9 was sulfonated in the same manner as in Example 9. The film thus obtained was immersed in a 30% by weight aqueous hydrogen peroxide solution at 30° C. for 30 minutes to conduct oxidation treatment and then air-dried. The degree of sulfonation of the film thus treated was $1.7 \times 10^{-3}$ milliequivalent/cm$^2$ and the IR absorbance ratio was 1.2. Then offset prints were obtained in the same manner as in Example 9. The letters of the prints were clear and the prints were of high quality, e.g., excellent in adhesion of ink and reproducibility of fine lines and dots and no occurrence of scumming.

EXAMPLE 12

A commercially available polyvinylidene chloride film (product of Kureha Chemical Ind. Co., Ltd.; water absorption at most 0.1%; size 10 cm × 15 cm; thickness 150 μm) was immersed in ethylene chloride containing 15% by weight of sulfuric anhydride at 0° C. for 25 hours to conduct sulfonation. After completion of the sulfonation, the film was thoroughly washed with water and air-dried. The degree of sulfonation of the film thus obtained was $5.2 \times 10$ milliequivalent/cm$^2$ and the IR absorbance ratio was 0.8.

Then the same YAG laser beam as in Example 6 was used to scan the film on the aluminum roll rotating at a rate of 10 m/sec. The printing plate thus obtained was subjected to the same offset printing as in Example 4 to give prints having clear patterns of 39 μm line width.

EXAMPLE 13

A commercially available poly(tetrafluoroethylene) film (product of Nitto Electric Industrial Co., Ltd.; water absorption at most 0.1%; size 10 cm × 15 cm; thickness 150 μm) was sulfonated in the same manner as in Example 4 except that the sulfonation was carried out at 30° C. for 30 minutes. The degree of sulfonation of the film was $1.3 \times 10^{-2}$ milliequivalent/cm$^2$ and the IR absorbance ratio was 1.6. This film was fixed on the same aluminum roll as employed in Example 1 with an adhesive and the same semiconductor laser beam as in Example 2 was used to scan the film on the aluminum roll rotating at a rate of 5 m/sec. The printing plate thus obtained was subjected to the same offset printing as in Example 4 to give prints having clear patterns of 14 μm line width.

EXAMPLE 14

The same poly(tetrafluoroethylene) film as employed in Example 13 was immersed in methanol containing 40% by weight of trimethylbenzyl ammonium hydroxide at 60° C. for one hour, thoroughly washed with water and air-dried. Then the film thus obtained was immersed in fuming sulfuric acid containing 20% by weight of sulfuric anhydride at 0° C. for 2 hours, then thoroughly washed with water, neutralized with 1N aqueous sodium hydroxide and air-dried in a dark place. The UV-visible light reflectance spectrum of the film thus obtained showed a broad absorption near 500 nm and it could be understood that conjugated polyenes had been formed on the surface of the film. The degree of sulfonation of the film was $2.6 \times 10^{-3}$ milliequivalent/cm$^2$ and the IR absorbance ratio was 2.0. The film was fixed on the same aluminum roll as employed in Example 1 with an adhesive and the same semiconductor laser beam as in Example 2 was used to scan the film on the aluminum roll in the same manner as in Example 2 except that the aluminum roll rotated at a rate of 15 m/sec, and the printing plate thus prepared was subjected to the same offset printing as in Example 4 to give prints having clear patterns of 12 μm line width.

EXAMPLE 15

An ethylene-ethyl acrylate copolymer film (ethyl acrylate content at the initiation of polymerization 6.5% by mol; number average molecular weight 13,000; water absorption 1.5%; size 10 cm × 15 cm; thickness 150 μm) was sulfonated in the same manner as in Example 4. After completion of the sulfonation, the film was taken out from the vessel, thoroughly washed with water and air-dried. The degree of sulfonation of the film thus obtained was $5.2 \times 10^{-3}$ milliequivalent/cm$^2$ and the IR absorbance ratio was 1.7. Then the film was processed with the same thermal head of the word processor as employed in Example 4 and the printing plate thus obtained was subjected to the same offset printing test as in Example 4 to give 10,000 copies of prints having clear letters.

EXAMPLE 16

The same procedure as in Example 15 was repeated to obtain the sulfonated ethylene-ethyl acrylate copolymer film. The film thus obtained was immersed in a mixed solution containing 10 parts by weight of potassium permanganate, 20 parts by weight of 95% by weight sulfuric acid and 100 parts by weight of water at 40° C. for 20 minutes to conduct oxidation treatment, then thoroughly washed with water and air-dried. The degree of sulfonation of the film thus treated was $2.4 \times 10^{-3}$ milliequivalent/cm$^2$ and the IR absorbance ratio was 1.4. This film was processed with the same thermal head of the line printer as employed in Example 7 to give a printing plate, and then the printing plate thus prepared was subjected to the same offset printing as in Example 4 to give prints having clear patterns. The reproducibility of fine lines and dots and the adhesion of ink were excellent.

COMPARATIVE EXAMPLE 2

The same ethylene-ethyl acrylate copolymer film as employed in Example 15 was sulfonated in the same manner as in Example 4 except that the sulfonation was conducted at 60° C. for 10 minutes. After completion of the sulfonation, the film was thoroughly washed with water and air-dried. The degree of sulfonation of the film thus obtained was $3.6 \times 10^{-3}$ milliequivalent/cm$^2$ and the IR absorbance ratio was 0.5.

Then the film was processed with the same thermal head of the word processor as employed in Example 4 and the printing plate thus prepared was subjected to the same offset printing as in Example 4 to give prints. The formation of letters was not sufficient.

EXAMPLE 17

An ethylene-vinyl acetate copolymer film (monomer ratio of ethylene to vinyl acetate at the initiation of polymerization 95:5; number average molecular weight 15,000; density 0.94; water absorption 1.8; size 10 cm×15 cm; thickness 150 μm) was sulfonated in the same manner as in Example 4 except that the sulfonation was carried out at 30° C. for 15 minutes. After completion of the sulfonation, the film was thoroughly washed with water and air-dried. The degree of sulfonation to the film thus obtained was $2.3 \times 10^{-3}$ milliequivalent/cm$^2$ and the IR absorbance ratio was 1.2. This film was processed with the same thermal head of the word processor as employed in Example 4 and the printing plate thus prepared was subjected to the same to the same offset printing as in Example 4 to give 10,000 copies of prints having clear letters without any occurrence of scumming.

EXAMPLE 18

The same ethylene-vinyl acetate copolymer film as employed in Example 17 was sulfonated in the same manner as in Example 4. After completion of the sulfonation, the film was thoroughly washed with water and air-dried. The degree of sulfonation of the film thus obtained was $1.4 \times 10^{-2}$ milliequivalent/cm$^2$ and the IR absorbance ratio was 1.2. Then this film was immersed in a 10% by weight aqueous sodium hypochlorite solution at 25° C. for 10 minutes to conduct oxidation treatment, then thoroughly washed with water and air-dried. The degree of sulfonation of the film thus treated was $1.3 \times 10^{-4}$ milliequivalent/cm$^2$ and the IR absorbance ratio was 1.0. This film was fixed on the same aluminum roll as employed in Example 1 with an adhesive and the same semiconductor laser beμm as in Example 2 was used to scan the film on the aluminum roll rotating at a rate of 15 m/sec and subsequently the printing plate thus prepared was subjected to the same offset printing as in Example 4 to give prints having clear patterns of 11 μm line width. Broadening and blurring of lines were not observed and the adhesion of ink was good.

EXAMPLE 19

A commercially available polyacrylonitrile sheet (product of Mitsui Toatsu Chemicals, Inc.; Xeclon®; water absorption 0.7%; size 10 cm×15 cm; thickness 200 μm) was immersed in ethylene dichloride containing 15% by weight of sulfuric anhydride at 0° C. for 30 hours to conduct sulfonation, then thoroughly washed with water and air-dried. The degree of sulfonation of the sheet thus obtained was $5.1 \times 10^{-4}$ milliequivalent/cm$^2$ and the IR absorbance ratio was 1.1. This sheet was fixed on the same aluminum roll as employed in Example 1 and the same YAG laser beam as in Example 6 was used to scan the sheet on the aluminum roll rotating at a rate of 2 m/sec, and the printing sheet thus prepared was subjected to the same offset printing as in Example 4 to give 10,000 copies of prints of the lines was not observed.

EXAMPLE 20

The procedure of Example 4 for the sulfonation was repeated except that the period of time of sulfonation was 30 minutes. After completion of the sulfonation, the high density polyethylene films were taken out from the vessel, thoroughly washed with water and air-dried. The degree of sulfonation of the films thus obtained was $4.2 \times 10^{-3}$ milliequivalent/cm$^2$ and the IR absorbance ratio was 1.6. Then printing plates were prepared from several films thus obtained under conditions of high resolution and high speed (resolution 16 dots/mm; voltage to the thermal head portion 12V; pulse width 0.8 millisecond; speed B-4 size plate/20 milliseconds) using a printing test machine of thermal head type (manufactured by Tanaka Electric Ind. Co., Ltd.). These printing plates were subjected to the same offset printing as in Example 4. As a result, the adhesion of ink was slightly insufficient and the reproducibility of fine dots and lines was difficult to some extent.

Further, several films sulfonated as described above were immersed in a 10% by weight aqueous sodium hypochlorite solution at 25° C. for 25 minutes, thoroughly washed with water and air-dried. The degree of sulfonation of the films thus treated was $1.2 \times 10^{-3}$ milliequivalent/cm$^2$ and the IR absorbance ratio was 1.8. Subsequently in the same manner as described above, printing plates were prepared from the films and then subjected to the offset printing. As a result, the letters of the prints thus obtained were clear and the adhesion of ink was excellent. Also the reproducibility of fine dots and lines was excellent.

COMPARATIVE EXAMPLE 3

The procedures of Example 20 for the sulfonation and the treatment with the sodium hypochlorite solution were repeated except that the treatment with the sodium hypochlorite solution was carried out at 40° C. for one hour. As a result, colorless films were obtained. The degree of sulfonation of the films was $0.9 \times 10^{-3}$ milliequivalent/cm$^2$ and the IR absorbance ratio was 0.8. Then in the same manner as in Example 20, printing plates were prepared from these films and subsequently subjected to offset printing. As a result, the occurrence of scumming was not observed in the offset prints thus obtained, but the reproducibility of the letters was not sufficient.

In 60 parts by weight of styrene were dissolved 30 parts by weight of a polystyrene (degree of polymerization 100) and 10 parts by weight of p-divinylbenzene, and then to the mixture were added 0.4 part by weight of benzoyl peroxide and 0.2 part by weight n-butyl phthalate and the copolymerization was conducted at 25° C. for 2 hours. The solid polymer thus obtained was cut into a sheet (thickness 200 μm) and plastic portions of the sheet were extracted with methanol and the remaining portions were cut into a sheet of size B-4. Then the sheet thus prepared was sulfonated in the same manner as in Example 4 except that the period of sulfonation was 15 minutes. After completion of the sulfonation, the sheet was taken out from the vessel, thoroughly washed with water and air-dried. The degree of sulfonation of the sheet was $3.2 \times 10^{-3}$ milliequivalent/cm$^2$ and the IR absorbance ratio was 1.2. Subsequently the sheet was fixed on the same aluminum roll as employed in Example 1 with an adhesive and a focused beam of 30 μm in diameter from the same He-Ne laser as employed in Example 1 was used to scan the sheet on the aluminum roll rotating at a rate of 70 cm/sec to prepare a printing plate and then the printing plate was subjected to the same offset printing as in Example 4 to give prints having clear patterns of 35 μm line width. The line width and the line space of the patterns printed in the central portion and the peripheral portions were the same and deformation of lines was not observed.

EXAMPLE 22

In water were dispersed 40 parts by weight of p-divinylbenzene and 60 parts by weight of vinyltoluene, and then 0.1 part by weight of lauroyl peroxide was added to the dispersion, and then suspension polymerization was carried out at 25° C. for about 3 hours. The polymer thus obtained was thoroughly washed with water, dried and pulverized (particle size 100 to 200 μm). The resulting powder was mixed with 10 parts by weight of dioctyl phthalate and 15 parts by weight of cyclohexanone and then mixed with 30 parts by weight of heat-melted polyvinyl chloride paste. The mixture was sufficiently kneaded by rolls heated at a temperature of 60° C. to 70° C. and then formed into sheets (size 10 cm×15 cm; thickness 150 μm) while evaporating the dispersing agent. The sheets thus prepared were mounted on a stainless steel roll (diameter 150 mm) and the roll was placed in a dried glass vessel equipped with an inlet tube for a mixture of gaseous $SO_3$ and $N_2$ gas and an exhaust tube. Then a mixture of gaseous $SO_3$ and $N_2$ gas (volume ratio 1:10) was introduced into the vessel at a rate of 1 l/min for 20 minutes. After completion of the reaction, the sulfonated sheets were thoroughly washed with water and air-dried. The degree of sulfonation of the sheets was $6.1 \times 10^{-3}$ milliequivalent/$cm^2$ and the IR absorbance ratio was 0.9.

When the applicability of the sheets to an all-automated offset platemaking and printing machine (Ricoh Co., Ltd.; Ricoh Autoprinter AP 7000 II) was examined, the processability of the sheets such as cutting and feeding of the sheets was almost the same as that of conventional electronic copying printing plate materials. Also when the sheets were processed with a thermal head of a word processor (manufactured by Sharp Kabushiki Kaisha; WD-530) and the applicability of the printing plates thus prepared to the above described printing machine was examined, the feedability, automatic fixibility and printability of the printing plates were good. The initial prints and the 5000th print were clear, and deformation and warping of the letters and ruled lines at the peripheral portions were not observed.

COMPARATIVE EXAMPLE 4

A commercially available biaxially stretched polystyrene sheet (product of Dainippon Ink and Chemicals, Inc.; DIC Sheet II; size B-4; thickness 200 μm) was sulfonated in the same manner as in Example 4. The sheet thus obtained was deformed and part of the sheet surface was dissolved so that the sheet could not be used as a printing sheet.

EXAMPLE 23

A commercially available polyvinyl alcohol film (product of Kanebo Ltd.; "Belltaf" $N_{2050}$; size 10 cm×15 cm; thickness 50 μm) was mounted on a glass rack and placed in a three-necked separable flask. After the inner atmosphere of the flask was replaced with dried $N_2$ gas, the inner temperature of the flask was adjusted at 110° C. by heating the outside of the flask. Then dried hydrogen chloride gas was introduced into the flask at a rate of 0.5 l/min for 60 hours to conduct sulfonation. After completion of the reaction, the film was taken out from the flask. The UV-visible light reflectance spectrum of the film thus obtained showed a strong absorption near 500 nm and it could be understood that conjugated polyenes had been formed on the film.

Then the film was subjected to the sulfonation in the same manner as in Example 4 except that the period of sulfonation was 5 minutes. The film thus sulfonated was brown and had a degree of sulfonation of $2.1 \times 10^{-4}$ milliequivalent/$cm^2$ and an IR absorbance ratio of 1.8. Subsequently the sulfonated film was fixed on the same aluminum roll as employed in Example 2 with an adhesive and the same semiconductor beam as in Example 2 was used to scan the film on the aluminum roll rotating at a rate of 15 m/sec to give a printing plate. Then the printing plate was mounted on the same offset printing machine as in Example 4 and subjected to offset printing. As a result, prints having clear image patterns of 13 μm line width were obtained.

What is claimed is:

1. A process for producing a photosensitive and heat-sensitive polymer which comprises
   sulfonating a polymer of an ethylenically unsaturated monomer having a number average molecular weight of at least 10,000 or a polymer having conjugated polyenes and a number average molecular weight of at least 10,000 selected from the group consisting of (a) a homopolymer or copolymer of a halogenated olefin having 2 to 3 carbon atoms and a copolymer of the halogenated olefin and an olefin having 2 to 8 carbon atoms; (c) a homopolymer or copolymer of an olefin having a polar group and a copolymer of the olefin having a polar group and an olefin having 2 to 8 carbon atoms; (d) a cross-linked aromatic polymer comprising 50 to 98% by mol of a monovinyl or monovinylidene aromatic monomer unit and 2 to 50% by mol of a polyvinyl monomer unit; and (e) a homopolymer or copolymer having conjugated polyenes of at least 3 sequence lengths with fuming sulfuric acid or sulfuric anhydride at a temperature of $-30°$ C. to 70° C., and treating the sulfonated polymer with an oxidizing agent to produce a photosensitive and heat-sensitive polymer having conjugated polyenes and sulfonic acid groups and an absorbance ratio of a strong band in the region of 1200 $cm^{-1}$ to 1300 $cm^{-1}$ assignable to sulfonic acid groups adjacent to conjugated polyenes of at least 3 sequence lengths to a strong band near 1050 $cm^{-1}$ assignable to sulfonic acid groups in the IR spectrum of at least 0.6.

2. The process of claim 1, wherein the sulfuric anhydride is employed as a solution of an organic solvent relatively less active to sulfuric anhydride.

3. The process of claim 2, wherein the organic solvent is selected from the group consisting of chloroform, carbon tetrachloride and ethylene dichloride.

4. The process of claim 1 or claim 2, wherein the sulfonation reaction is carried out at a temperature of 0° C. to 40° C.

5. The process of claim 1, wherein the oxidizing agent is selected from the group consisting of an aqueous hypochlorite solution, an aqueous hydrogen peroxide solution, a sulfuric acid solution of a dichromate, an aqueous perchlorate solution and an aqueous permanganate solution.

6. The process of claim 5, wherein the aqueous hypochlorite solution is an aqueous sodium hypochlorite solution.

7. The process of claim 1 which further comprises treating the sulfonated polymer with an aqueous silver nitrate solution or an aqueous copper chloride solution to convert the sulfonic acid groups to silver sulfonate groups or copper sulfonate groups.

8. A process for producing a photosensitive and heat-sensitive polymer which comprises sulfonating a polymer of an ethylenically unsaturated monomer having a number average molecular weight of at least 10,000 or a polymer having conjugated polyenes and a number average molecular weight of at least 10,000 and selected from the group consisting of (a) a homopolymer or copolymer of an olefin having 2 to 8 carbon atoms; (b) a homopolymer or copolymer of a halogenated olefin having 2 to 3 carbon atoms and a copolymer of the halogenated olefin and an olefin having a polar group and a copolymer of the olefin having a polar group and an olefin having 2 to 8 carbon atoms; (d) a crosslinked aromatic polymer comprising 50 to 98% by mol of a monovinyl or monovinylidene aromatic monomer unit and 2 to 50% by mol of a polyvinyl monomer unit; and (e) a homopolymer or copolymer having conjugated polyenes of at least 3 sequence lengths with fuming sulfuric acid or sulfuric anhydride at a temperature of $-30°$ C. to $70°$ C. and treating the sulfonated polymer with an aqueous silver nitrate solution or an aqueous copper chloride solution to convert the sulfonic acid groups to silver sulfonate groups or copper sulfonate groups to produce a photosensitive and heat-sensitive polymer having conjugated polyenes and sulfonic acid groups and an absorbance ratio of a strong band in the region of 1200 $cm^{-1}$ to 1300 $cm^{-1}$ assignable to sulfonic acid groups adjacent to conjugated polyenes of at least 3 sequence lengths to a strong band near 1050 $cm^{-1}$ assignable to sulfonic acid groups in the IR spectrum of at least 0.6.

* * * * *

UNITED STATES PATENT AND TRADEMARK OFFICE
CERTIFICATE OF CORRECTION

PATENT NO. : 4,965,322
DATED : October 23, 1990
INVENTOR(S) : Yasuki SHIMAMURA et al It is certified that error appears in the above-indentified patent and that said Letters Patent is hereby corrected as shown below:

Column 18, line 30, "(a) a homopolymer or copolymer of a" should be —(a) a homopolymer or copolymer of an olefin having 2 to 8 carbon atoms; (b) a homopolymer or copolymer of a—.

Signed and Sealed this

Twenty-eighth Day of June, 1994

Attest:

BRUCE LEHMAN

Attesting Officer

Commissioner of Patents and Trademarks